H. S. HUBBELL.
CHUCK.
APPLICATION FILED MAR. 13, 1916.
1,328,627.
Patented Jan. 20, 1920.
2 SHEETS—SHEET 1.
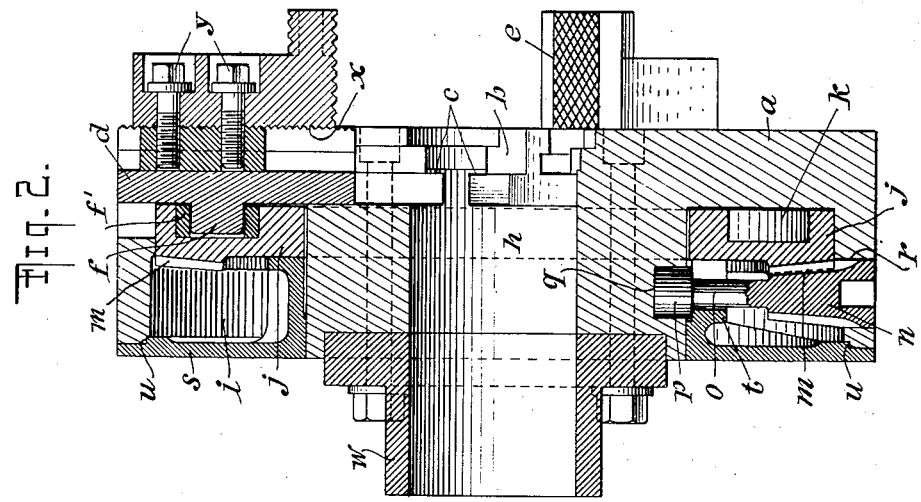
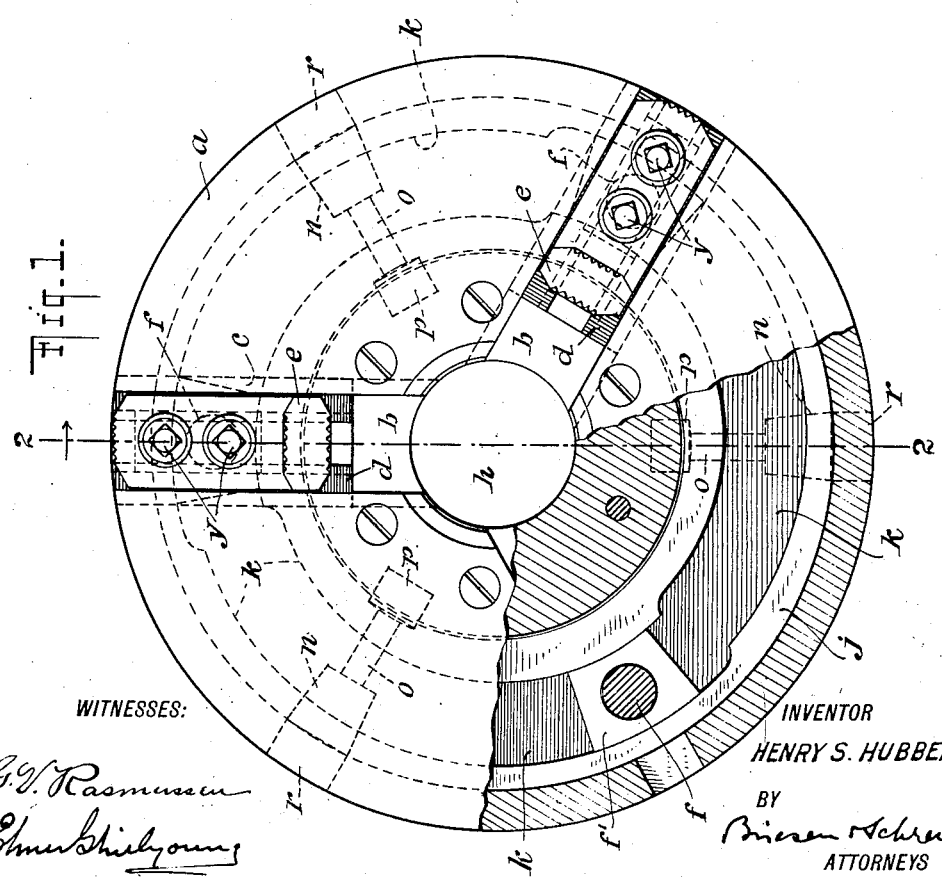
WITNESSES:
INVENTOR
HENRY S. HUBBELL
BY
ATTORNEYS

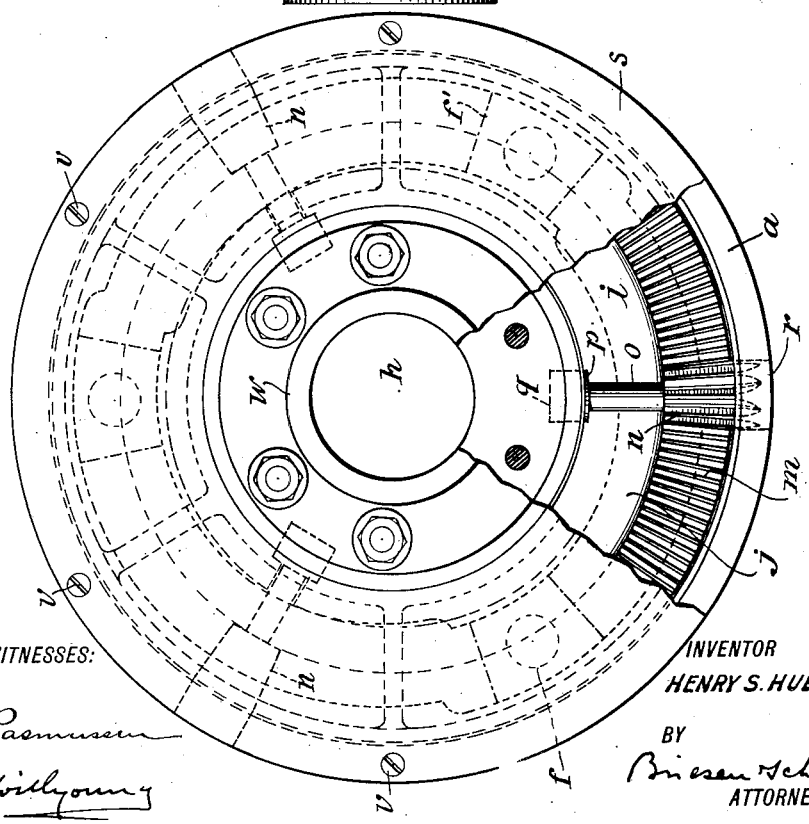

UNITED STATES PATENT OFFICE.

HENRY S. HUBBELL, OF ASHBURNHAM, MASSACHUSETTS, ASSIGNOR TO T. R. ALMOND MANUFACTURING COMPANY, OF ASHBURNHAM, MASSACHUSETTS, A CORPORATION OF NEW YORK.

CHUCK.

1,328,627.  Specification of Letters Patent.  Patented Jan. 20, 1920.

Application filed March 13, 1916. Serial No. 83,743.

*To all whom it may concern:*

Be it known that I, HENRY S. HUBBELL, a citizen of the United States, and a resident of Ashburnham, Worcester county, State of Massachusetts, have invented certain new and useful Improvements in Chucks, of which the following is a specification.

My invention relates to chucks for machine tools and the like and has for its object to provide a more efficient, stronger and more durable chuck than has hitherto been known.

One of the problems of modern manufacturing enterprises is the securing of an efficient lathe chuck. Most of the lathe chucks now in use in the United States are defective in that they do not measure up to the standards required in high powered machinery. These defects are due to a variety of causes but mainly arise in the means used for holding the chuck jaws tight upon the work without creating undue strain in the chuck itself. It is the principal object of the present invention to produce a chuck which will avoid the various defects of existing chucks, and this is accomplished by causing to coöperate, in a massive, integral chuck body, selected chuck operating elements so placed and grouped that all substantial operating strains are withstood and taken up directly by the integral body of the chuck. This is brought about by the mechanism illustrated in the drawings, in which Figure 1 is a front elevation, partly broken away, of a preferred chuck according to my invention; Fig. 2 is a section along the line 2—2 of Fig. 1; Fig. 3 is a rear elevation of the chuck, part being broken away; Fig. 4 is a side elevation taken from the left of Fig. 1; and Fig. 5 is a side elevation of the rear plate.

In the drawings, $a$ is a chuck body which, as shown, is a massive, integral, single piece of metal, having upon the forward member or front face thereof the radial slots $b$, which have undercut portions $c$, in which the slides $d$ for the jaws $e$ are adapted to be guided, supported and moved. Each slide $d$ carries a projecting pin $f$, which is held in a block $f'$ which block is itself engaged with and controlled by the scroll $j$, as will later be described. The chuck body $a$ is in the form of a massive metal ring having a central aperture $h$. The rear portion of the body of the chuck has formed in it a continuous circular slot $i$. Inasmuch as the jaw operating parts are introduced into the chuck body from the rear, it is necessary that the circular slot shall be no narrower at its narrowest portion than that part of it which serves as a seat for the scroll $j$. This scroll $j$, in its front surface, is provided with three similar cam grooves $k$, each of the three grooves being eccentric with respect to the axis of the chuck, and each of the grooves is adapted to coöperate with one of the jaw slides $d$, through the block $f'$ which is applied to the pins $f$, so as to be capable of radially moving said jaw slides in or out. The rear portion of the scroll plate $j$ carries gear teeth $m$, which are engaged by radially disposed pinions $n$. The pinions $n$ have a shank $o$ and terminate at an inner portion on the chuck in the enlarged head $p$, which serves as a means for holding said pinion permanently in place in the body of the chuck. The head $p$ is set in a countersunk recess $q$, said recess being in alinement with the peripheral opening $r$, through which the pinion is inserted from the outside of the chuck. The pinions are prevented from falling out of the chuck by the rear plate $s$, a fork $t$ of which straddles the pinion shank $o$ and lies in front of the enlarged head $p$, thereby preventing axial outward movement of the pinion after the plate $s$ is fixed in position. The rearward, outer edge of the chuck body $a$ is formed into a seat $u$ for the rear plate $s$ and the plate is held to the body of the chuck by the screws $v$. The part $w$ is used for attaching the chuck to a spindle, it being understood that the chuck may also be used in connection with turret lathes.

The assembling of the chuck consists in introducing the jaw slides $d$ into the slots $b$. The blocks $f'$ are placed upon the pins $f$ and the scroll plate is then introduced from the rear and laid against its seat, one of the blocks $f'$ lying in each one of the grooves $k$. The pinions $n$ are next inserted and this completes the assembling of the working parts of the chuck. The rear plate $s$ is then applied and the jaws $e$ are placed in their proper positions, according to desired adjustment, upon the jaw slides $d$, being held in place in the selected positions by the bolts $y$. As any one of the pinions is rotated, the arrangement of the scroll grooves $k$ is such that the maximum amount of power is exercised upon the jaws. The maximum radial movement of the jaws produced by the scroll grooves *k* is not more than about one-eighth inch, so that the scroll *j* is used merely to tighten or loosen the jaws, while the burden of adjustments of the position of the jaws with respect to the work, or different kinds of work, is not placed upon the scroll.

From the foregoing description it will be seen that the essence of the invention resides in the massive character of the chuck body in connection with the selection of the most appropriate chuck operating means and the fact that the assembling of the chuck, except for the jaw slides, is altogether effected from the rear of the chuck, whereby the entire forward part of the chuck is a single piece of metal and is not composed of plates or other separate elements.

While the selection of the special type of scroll and the manner in which it controls and moves the jaw slides and the way in which the jaws are connected with these slides are important elements of my invention, I do not claim to be the originator of such types of connections or movements by themselves but what I do claim is:

In a lathe chuck, a body comprising a forward member having radial slots, an annular outer integral wall and an integral inner boss projecting rearwardly from said forward member to form a relatively deep annular rear recess, said forward member, outer wall and inner boss constituting a single metal unit, individually adjustable, jaws movably mounted in said radial slots and occupying an initial stationary position predetermined by the element to be gripped, a scroll rotatably mounted in said recess in surface engagement with the inner face of said forward member, said scroll being provided with a plurality of duplicate cam grooves communicating with each other and extending continuously circumferentially thereof and being slightly eccentric to said scroll, individual devices whereby each jaw is operatively connected with a coöperating cam groove, means to hold the scroll in place within the chuck body and means for rotating said scroll whereby said cam grooves impart a final tightening movement in one direction to said jaws from said initial position and a simple loosening movement in the opposite direction.

In testimony whereof I have hereunto set my hand.

HENRY S. HUBBELL.

Witnesses:
ELMER G. WILLYOUNG,
GEORGE DU BON.